(12) United States Patent
Zhang et al.

(10) Patent No.: US 10,627,958 B2
(45) Date of Patent: Apr. 21, 2020

(54) DRIVING METHOD AND DRIVING DEVICE FOR TOUCH PANEL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhengxin Zhang, Beijing (CN); Shuai Xu, Beijing (CN); Haifei Su, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/112,046

(22) Filed: Aug. 24, 2018

(65) Prior Publication Data

US 2019/0073085 A1 Mar. 7, 2019

(30) Foreign Application Priority Data

Sep. 7, 2017 (CN) .......................... 2017 1 0801697

(51) Int. Cl.
*G06F 3/041* (2006.01)
*G06F 3/044* (2006.01)
*G09G 3/20* (2006.01)
*G09G 3/36* (2006.01)

(52) U.S. Cl.
CPC .......... *G06F 3/0418* (2013.01); *G06F 3/0412* (2013.01); *G06F 3/0416* (2013.01); *G09G 3/20* (2013.01); *G09G 3/3648* (2013.01); *G06F 3/044* (2013.01); *G09G 2354/00* (2013.01)

(58) Field of Classification Search
CPC ...... G06F 3/0418; G06F 3/0412; G06F 3/044; G06F 3/0416; G09G 3/3648; G09G 3/20; G09G 2354/00
See application file for complete search history.

(56) References Cited

U.S. PATENT DOCUMENTS

| | | | |
|---|---|---|---|
| 2013/0021283 A1* | 1/2013 | Nishimura | G06F 3/0416 345/173 |
| 2016/0162087 A1 | 6/2016 | Lee et al. | |
| 2017/0153736 A1* | 6/2017 | Kim | G06F 3/0412 |
| 2017/0364169 A1* | 12/2017 | Huang | G09G 3/20 |

FOREIGN PATENT DOCUMENTS

| | | |
|---|---|---|
| CN | 106681568 A | 5/2017 |
| CN | 106842660 A | 6/2017 |
| CN | 106940500 A | 7/2017 |

OTHER PUBLICATIONS

First Office Action for CN Appl. No. 201710801697.6, dated Nov. 5, 2019.

* cited by examiner

*Primary Examiner* — Brent D Castiaux
(74) *Attorney, Agent, or Firm* — Foley & Lardner LLP

(57) ABSTRACT

A driving method and a driving device for a touch panel are disclosed. The driving method of a touch panel comprises: inputting a first touch scan signal to a touch electrode during a first touch period before a display period; and inputting a second touch scan signal to the touch electrode during a second touch period after the display period, the first touch scan signal and the second touch scan signal being opposite in polarity.

18 Claims, 4 Drawing Sheets

S1 — inputting a first touch scan signal to a touch electrode in a first touch period before a display period S2 — inputting a second touch scan signal to the touch electrode in a second touch period after the display period

DRIVING METHOD AND DRIVING DEVICE FOR TOUCH PANEL

CROSS-REFERENCE TO RELATED APPLICATIONS

This application claims priority to Chinese Patent Application No. 201710801697.6 as filed on Sep. 7, 2017, the disclosure of which is incorporated herein in its entirety by reference.

TECHNICAL FIELD

The present disclosure relates to the technical field of display technology, particularly to a driving method and driving device for a touch panel.

BACKGROUND

With the rapid development of display technology, touch screen panels have gradually spread throughout our lives. At present, the touch screen panels can be classified into Add-On Mode, On-Cell Mode, In-Cell Mode and the like according to their composition structures. The Add-on Mode touch panel generally has its touch circuit and display circuit produced separately, and then joined together to become a touch panel with touch function, which has the disadvantages of high production cost, low light transmittance, and larger module thickness. The In-cell Mode touch panel embeds the touch electrodes of the touch module within the display module to integrate the display function with the touch function, thereby not only greatly reducing the overall thickness of the module structure, but also making the product thinner and lighter. In addition, the production cost may be greatly reduced, thereby leading to lower cost.

At present, there are generally three types of in-cell touch mode panels: resistive touch panels, capacitive touch panels, and optical touch panels. As compared with resistive touch screens, capacitive touch screens have advantages of long life, high light transmittance, multi-touch supporting and the like, and also has a good suppression of noise and parasitic capacitance to ground. Thus, the capacitive touch screens have gradually become the mainstream of touch panels. The capacitive touch screens generally comprise self-capacitive touch screens and mutual-capacitive touch screens. Since the self-capacitive touch screens only need one layer of touch electrodes, and can perform touch detection by detecting whether the self-capacitance of the touch electrodes changes, it has advantages of simple structure and easy implementation.

SUMMARY

An embodiment of the present disclosure provides a driving method for a touch panel, comprising:

inputting a first touch scan signal to a touch electrode during a first touch period before a display period; and inputting a second touch scan signal to the touch electrode during a second touch period after the display period, the first touch scan signal and the second touch scan signal being opposite in polarity.

According to some embodiments, the first touch scan signal and the second touch scan signal being opposite in polarity comprising:

a voltage value of the first touch scan signal is greater than a voltage value of a common voltage signal, a voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal; or, the voltage value of the first touch scan signal is less than the voltage value of the common voltage signal, the voltage value of the second touch scan signal is greater than the voltage value of the common voltage signal, and a difference value of the voltage value of the common voltage signal minus the voltage value of the first touch scan signal equals a difference value of the voltage value of the second touch scan signal minus the voltage value of the common voltage signal.

According to some embodiments, inputting the first touch scan signal to the touch electrode comprises:

raising a potential of the touch electrode from a voltage value of a common voltage signal to a voltage value of a first low level;

applying a first pulse signal to the touch electrode with the first low level as a reference; and lowering the potential of the touch electrode from the voltage value of the first low level back to the voltage value of the common voltage signal after the end of applying the first pulse signal to the touch electrode.

According to some embodiments, applying the first pulse signal to the touch electrode comprises:

a first processing of raising the potential of the touch electrode from a voltage value of a first low level to a voltage value of a first high level; lowering the potential of the touch electrode from the voltage value of the first high level back to the voltage value of the first low level after holding the first high level for pulse periods, and holding the first low level for pulse periods; and repeating the above first and second processing.

According to some embodiments, applying the first pulse signal to the touch electrode further comprises:

detecting whether there is a touch operation, if there is no touch operation, stopping outputting the first pulse signal after an end of applying the first pulse signal to the touch electrode; if there is a touch operation, continuously applying the first pulse signal to the touch electrode after the end of applying the first pulse signal to the touch electrode.

According to some embodiments, inputting the second touch scan signal to the touch electrode comprises:

lowering a potential of the touch electrode from a voltage value of a common voltage signal to a voltage value of a second high level;

applying a second pulse signal to the touch electrode with the second high level as a reference; and raising the potential of the touch electrode from the voltage value of the second high level to the voltage value of the common voltage signal after the end of applying the second pulse signal to the touch electrode.

According to some embodiments, applying the second pulse signal to the touch electrode comprises: a third processing of lowering a potential of the touch electrode from a voltage value of a second high level to a voltage value of a second low level, a fourth processing of raising the potential of the touch electrode from the voltage value of the second low level to the voltage value of the second high level after holding the second low level for pulse periods, and holding the second high level for pulse periods; and repeating the above third and fourth processing.

According to some embodiments, applying the second pulse signal to the touch electrode further comprises:

detecting whether there is a touch operation, if there is no touch operation, stopping outputting the second pulse signal after the end of applying the second pulse signal to the touch electrode; if there is a touch operation, continuously applying the second pulse signal to the touch electrode after the end of applying the second pulse signal to the touch electrode.

An embodiment of the disclosure further provides a driving device for a touch panel, comprising:

a first signal circuit for inputting a first touch scan signal to a touch electrode during a first touch period before a display period; and a second signal circuit for inputting a second touch scan signal to the touch electrode during a second touch period after the display period, the first touch scan signal and the second touch scan signal being opposite in polarity.

According to some embodiments, the first touch scan signal and the second touch scan signal being opposite in polarity comprising:

a voltage value of the first touch scan signal is greater than a voltage value of a common voltage signal, a voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal; or, the voltage value of the first touch scan signal is less than the voltage value of the common voltage signal, the voltage value of the second touch scan signal is greater than the voltage value of the common voltage signal, and a difference value of the voltage value of the common voltage signal minus the voltage value of the first touch scan signal equals a difference value of the voltage value of the second touch scan signal minus the voltage value of the common voltage signal.

According to some embodiments, the first signal circuit comprises a first step-up sub-circuit, a first pulse sub-circuit and a first step-down sub-circuit, wherein:

the first step-up sub-circuit is used for raising a potential of the touch electrode from a voltage value of a common voltage signal to a voltage value of a first low level;

the first pulse sub-circuit is used for applying a first pulse signal to the touch electrode with the first low level as a reference; and the first step-down sub-circuit is used for lowering the potential of the touch electrode from the voltage value of the first low level back to the voltage value of the common voltage signal after the end of applying the first pulse signal to the touch electrode.

According to some embodiments, the first signal circuit further comprises a first detection sub-circuit, wherein the first detection sub-circuit is used for detecting whether there is a touch operation during a period in which the first pulse signal is applied to the touch electrode, if there is no touch operation, controlling the first pulse sub-circuit to stop outputting the first pulse signal after the end of applying the first pulse signal to the touch electrode; if there is a touch operation, controlling the first pulse sub-circuit to continuously apply the first pulse signal to the touch electrode after the end of applying the first pulse signal to the touch electrode.

According to some embodiments, the second signal circuit comprises a second step-down sub-circuit, a second pulse sub-circuit and a second step-up sub-circuit, wherein:

the second step-down sub-circuit is used for lowering a potential of the touch electrode from a voltage value of a common voltage signal to a voltage value of a second high level;

the second pulse sub-circuit is used for applying a second pulse signal to the touch electrode with the second high level as a reference; and the second step-up sub-circuit is used for raising the potential of the touch electrode from the voltage value of the second high level to the voltage value of the common voltage signal after an end of applying the second pulse signal to the touch electrode.

According to some embodiments, the second signal circuit further comprises a second detection sub-circuit, wherein the second detection sub-circuit is used for detecting whether there is a touch operation during a period in which the second pulse signal is applied to the touch electrode, if there is no touch operation, controlling the second pulse sub-circuit to stop outputting the second pulse signal after the end of applying the second pulse signal to the touch electrode; if there is a touch operation, controlling the second pulse sub-circuit to continuously apply the second pulse signal to the touch electrode after the end of applying the second pulse signal to the touch electrode.

An embodiment of the present disclosure further provides a touch panel comprising the driving device for a touch panel as described above.

DESCRIPTIONS OF DRAWINGS

The accompanying drawings, which are comprised to provide a further understanding of the disclosure and are incorporated in and constitute a part of this specification, illustrate embodiments of the disclosure, and serve to explain the present disclosure together with the illustrative embodiments of the present application, but are not limitation of the technical solution of the present disclosure. The size and the region shape of each component in the drawings do not reflect the real scale thereof, and are only for a purpose of schematically illustrating the contents of the present disclosure.

EMBODIMENTS

In actual use, the inventors of the present application have found that the in-cell capacitive touch panel in the related art has a problem that optical characteristics thereof may change before and after the touch, for example, visual jitters and afterimages may occur, resulting in deterioration of display quality.

A technical problem to be solved by the embodiments of the present disclosure is to provide a driving method and a driving device for a touch panel to solve the problem that the optical characteristics of the touch panels in the related art may change before and after the touch.

The embodiments of the present disclosure provide a driving method and a driving device for a touch panel, through inputting touch scan signals being opposite in polarity to the touch electrode during two touch periods before and after the display period, such that the touch scan signals in the two touch periods are symmetrically with respect to the common voltage signal, the present disclosure not only cancels the influence of the touch scan signal on a common voltage signal, but also cancels the influence of the touch scan signal on an electric field in the touch panel, thereby extra liquid crystal deflection can be eliminated, visual jitters and afterimages before and after the touch can be avoided, the display quality can be improved, and the problem that the optical characteristics of the touch panels in the related art may change before and after the touch can be effectively overcome.

Certainly, any of the products or methods implementing the present disclosure does not necessarily achieve all the above advantages at the same time. Other features and advantages of the disclosure will be presented in the following description, and partly become apparent in the following description or be appreciated in practicing of the disclosure. The objectives and other advantages of the embodiments of the present disclosure can be realized and obtained by the structure particularly pointed out in the description, claims and accompanying drawings.

The embodiments of the present disclosure will be described in detail below in combination with the drawings. The following embodiments are intended to illustrate the disclosure but are not intended to limit the scope of the disclosure. It should be noted that, in the case of no conflict, the embodiments and the features of the embodiments of the present disclosure may be combined with each other.

Figure 1:
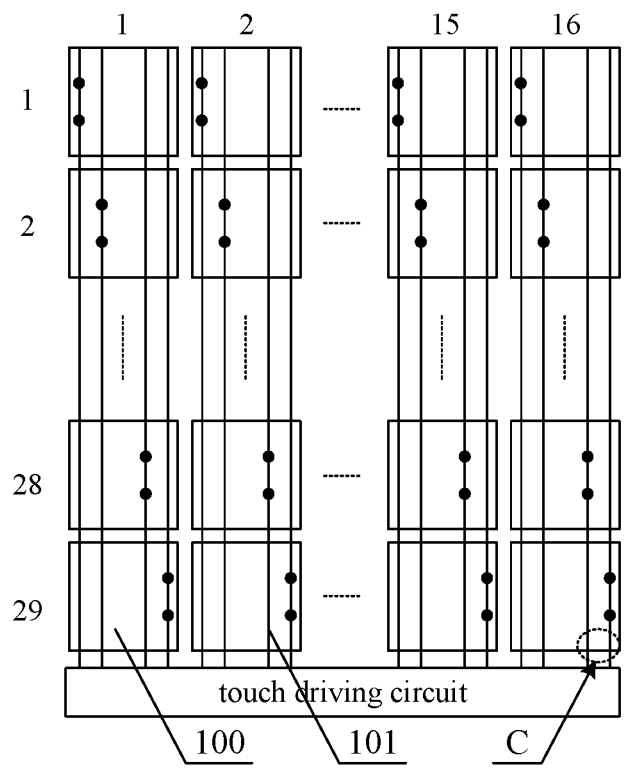
FIG. 1 is a schematic structural view of an in-cell self-capacitive touch panel in the related art.

The current in-cell mode self-capacitive touch panel directly adds touch electrodes and touch signal lines on an existing Thin Film Transistor (TFT) array substrate. FIG. 1 is a schematic structural view of an in-cell mode self-capacitive touch panel in the related art. As shown in FIG. 1, each rectangular pattern of about 4×4 mm$^2$ or 5×5 mm$^2$ in the touch panel is a touch electrode 100, and each touch electrode 100 is connected to a touch driving circuit by a touch signal line 101. During operation, a touch by a finger of a human causes the self-capacitance of a corresponding touch electrode 100 to change, and the touch drive circuit determines the specific position of the finger according to the change of the capacitance of the touch electrode 100. Generally, the touch panel adopts an electrode layer to which a common voltage is provided as a touch layer, and the electrode layer is "divided" to form rectangular touch electrodes 100 as shown in FIG. 1. A touch electrode 100 covers a plurality of pixels and is control by a touch signal line 101. The touch panel adopts a time-division driving mode. One frame of effective time is divided into a display period (Display Time) and a touch period (Touch Time), and driving signals for the two periods are separately processed. In the display period, the touch electrode is multiplexed as a common electrode, and the touch signal line is multiplexed as a common electrode line, the touch signal line provides a common voltage signal to the touch electrode, and no touch signal scan is performed to ensure normal display. In the touch period (which is also referred to as a blanking interval of display cycles), the touch driving circuit performs touch signal scan using the touch signal line, superimposes a touch scan signal on the basis of the common voltage. The touch scan signal is usually a pulse signal. At this time, the display of one frame has been completed, and the display state is substantially not affected by the touch signal, i.e., their operations are separate from each other in a time-division manner.

Figure 2A:
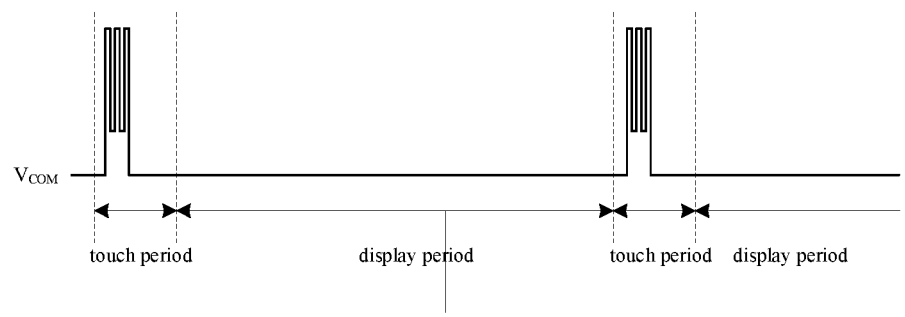
FIG. 2a is a schematic diagram of a pulse signal waveform of the touch panel in an idle state in the related art.
Figure 2B:
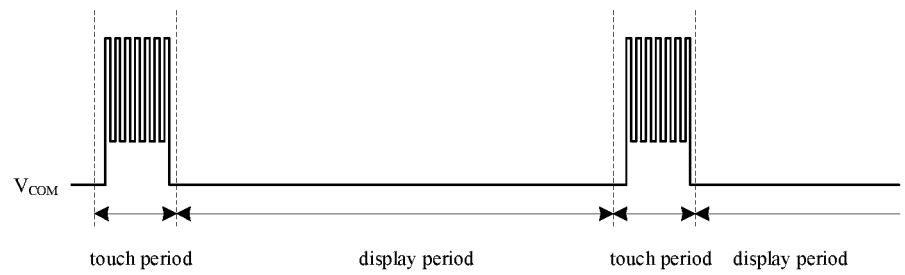
FIG. 2b is a schematic diagram of a pulse signal waveform of the touch panel in an active state in the related art.

According to the research of the inventors of the present application, the reason why the optical characteristics of the in-cell mode self-capacitive touch panel in the related art as shown in FIG. 1 change before and after the touch is as follows: the touch panel in the related art usually divides the touch period into two operation states: an idle state and an active state. Different numbers of pulse signals are superimposed on the basis of the common voltage signal in these two operation states to save power consumption. FIG. 2a is a schematic diagram of a pulse signal waveform of the touch panel in the related art in an idle state, and FIG. 2b is a schematic diagram of a pulse signal waveform of the touch panel in the related art in an active state. When only display is performed on the touch panel without a touch operation, the number of pulse signal outputs is A, and this state is an idle state, as shown in FIG. 2a. When a touch operation occurs, the number of pulse signal outputs is B much larger than A. This state is an active state, as shown in FIG. 2b. Since the pulse signal is superimposed on the common voltage signal, with different number of pulse signals in the two states, and all the pulses are positive, it may cause the common voltage signal to drift, that is, the common voltage value deviates from an optimum common voltage value required for display, leading to additional deflection of liquid crystals, and causing visual jitters before and after the touch. In addition, in the active state, a larger number of pulse signals are superimposed on the common voltage signal, which may cause an abnormal electric field for driving the liquid crystals, leading to serious afterimages before and after the touch.

Figure 3:
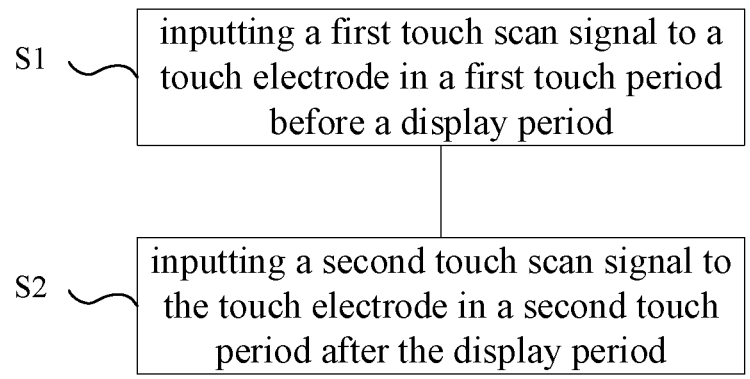
FIG. 3 is a flowchart of a driving method for a touch panel according to some embodiments of the present disclosure.

To this end, embodiments of the present disclosure provide a driving method and a driving device for a touch panel to overcome the problem that the optical characteristics of the touch panel change before and after the touch. The idea of the present disclosure is to input touch scan signals being opposite in polarities to the touch electrode during two touch periods before and after a display period. FIG. 3 is a flowchart of a driving method for a touch panel according to some embodiments of the present disclosure. As shown in FIG. 3, the driving method for the touch panel according to this embodiment comprises:

S1: inputting a first touch scan signal to a touch electrode during a first touch period before a display period;

S2: inputting a second touch scan signal to the touch electrode during a second touch period after the display period.

The first touch scan signal and the second touch scan signal are opposite in polarity, wherein "the first touch scan signal and the second touch scan signal are opposite in polarity" means that the polarities of the two touch scan signals are opposite to each other with respect to the common voltage signal. For example, the voltage value of the first touch scan signal is greater than the voltage value of the common voltage signal, the voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal; or, the voltage value of the first touch scan signal is less than the voltage value of the common voltage signal, the voltage value of the second touch scan signal is greater than the voltage value of the common voltage signal, and a difference value of voltage value of the common voltage signal minus the voltage value of the first touch scan signal equals a difference value of the voltage value of the second touch scan signal minus the voltage value of the common voltage signal. That is to say, the two touch scan signals are symmetrically arranged with respect to the common voltage signal.

The embodiments of the present disclosure provide a driving method for a touch panel, through inputting touch scan signals being opposite in polarity to the touch electrode during two touch periods before and after the display period, such that the touch scan signals in the two touch periods are symmetrically with respect to the common voltage signal, the present disclosure not only cancels the influence of the touch scan signal on a common voltage signal, but also cancels the influence of the touch scan signal on an electric field in the touch panel, thereby extra liquid crystal deflection can be eliminated, visual jitters and afterimages before and after the touch can be avoided, and the display quality can be improved.

In the embodiment of the present disclosure, the touch scan signal is a pulse signal having a periodic waveform, such as a rectangular wave, a sine wave or a triangular wave, and the pulse frequencies of the first touch scan signal and the second touch scan signal are the same. In the idle state, the number of pulses of the first touch scan signal and the second touch scan signal is A. In the active state, the number of pulses of the first touch scan signal and the second touch scan signal is B far greater than A. In a specific implementation, A and B may be set according to actual needs, which are not specifically limited in the present disclosure.

The technical solutions of embodiments of the present disclosure will be described in detail below with specific embodiments.

Figure 4:
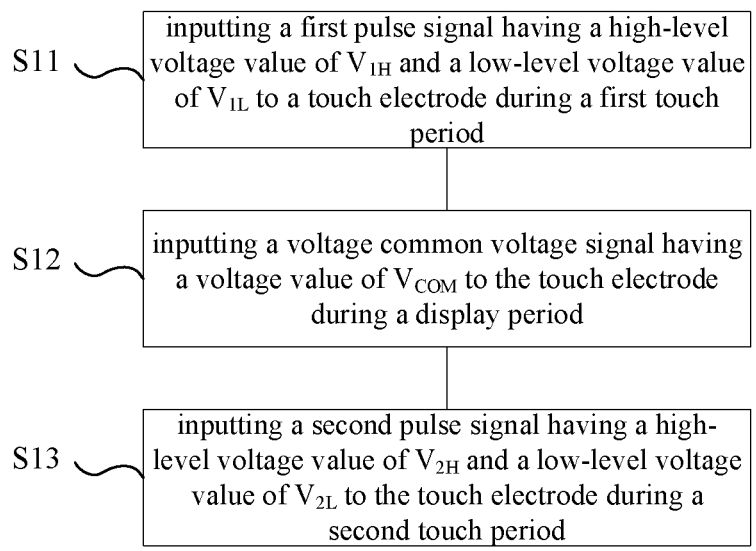
FIG. 4 is a flowchart of a driving method for a touch panel according to some embodiments of the present disclosure.

FIG. 4 is a flowchart of a driving method for a touch panel according to some embodiments of the present disclosure. As shown in FIG. 4, the driving method for the touch panel according to this embodiment comprises:

S11: inputting a first pulse signal having a high-level voltage value of $V_{1H}$ and a low-level voltage value of $V_{1L}$ to a touch electrode during a first touch period;

S12: inputting a common voltage signal having a voltage value of $V_{COM}$ to the touch electrode during a display period;

S13: inputting a second pulse signal having a high-level voltage value of $V_{2H}$ and a low-level voltage value of $V_{2L}$ to the touch electrode during a second touch period;

wherein $V_{1H}>V_{COM}$, $V_{1L}>V_{COM}$, $V_{2H}<V_{COM}$, $V_{2L}<V_{COM}$, and $V_{1H}-V_{COM}=V_{COM}-V_{2L}$, $V_{1L}-V_{COM}=V_{COM}-V_{2H}$.

In this embodiment, step 11 may comprise:

S111: raising the potential of the touch electrode from the voltage value $V_{COM}$ of the common voltage signal to a voltage value $V_{1L}$ of a first low level;

S112: applying a first pulse signal to the touch electrode with the first low level as a reference;

S113: lowering the potential of the touch electrode from the voltage value $V_{1L}$ of the first low level back to the voltage value $V_{COM}$ of the common voltage signal after the end of applying the first pulse signal to the touch electrode.

Wherein, applying the first pulse signal to the touch electrode may comprise: a first processing of raising the potential of the touch electrode from the voltage value $V_{1L}$ of the first low level to a voltage value $V_{1H}$ of a first high level; a second processing of lowering the potential of the touch electrode from the voltage value $V_{1H}$ of the first high level back to the voltage value $V_{1L}$ of the first low level after holding the first high level for pulse periods, and holding the first low level for pulse periods; and repeating the above first and second processing until the number of pulses reaches a preset value.

In this embodiment, step 13 may comprise:

S131: lowering the potential of the touch electrode from the voltage value $V_{COM}$ of the common voltage signal to a voltage value $V_{2H}$ of a second high level;

S132: applying a second pulse signal to the touch electrode with the second high level as a reference;

S133: raising the potential of the touch electrode from the voltage value $V_{2H}$ of the second high level to the voltage value $V_{COM}$ of the common voltage signal after the end of applying the second pulse signal to the touch electrode.

Wherein, applying the second pulse signal to the touch electrode may comprise: a third processing of lowering the potential of the touch electrode from the voltage value $V_{2H}$ of the second high level to a voltage value $V_{2L}$ of a second low level; a fourth processing of raising the potential of the touch electrode from the voltage value $V_{2L}$ of the second low level to the voltage value $V_{2H}$ of the second high level after holding the second low level for pulse periods, and holding the second high level for pulse periods; and repeating the above third and fourth processing until the number of pulses reaches a preset value.

In an actual implementation, the voltage value $V_{COM}$ of the common voltage signal, the voltage value $V_{1H}$ of the first high level, the voltage value $V_{1L}$ of the first low level, the voltage value $V_{2H}$ of the second high level, the voltage value $V_{2L}$ of the second low level can be set according to actual needs. For example, when the voltage value $V_{COM}$ of the common voltage signal is −1 V, the voltage value $V_{1L}$ of the first low level may be set to 0.5 to 1.5 V, and the voltage value $V_{1H}$ of the first high level is 4.5 to 5.5 V, and the voltage value $V_{2H}$ of the second high level is −2.5 to −3.5 V, and the voltage value $V_{2L}$ of the second low level is −6.5 to −7.5 V.

Figure 5:
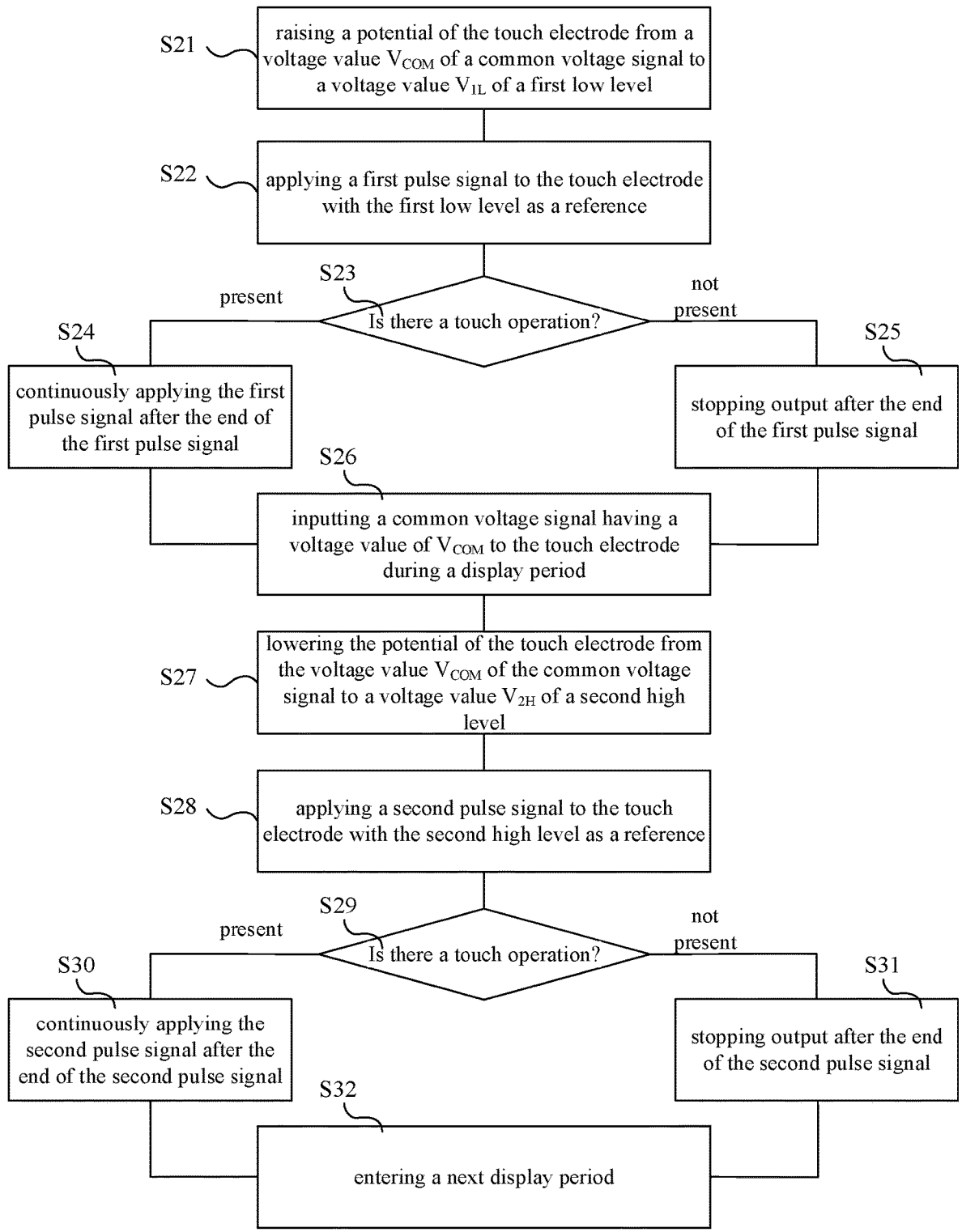
FIG. 5 is a flowchart of a driving method for a touch panel according to some embodiments of the present disclosure.

This embodiment is an extension on the basis of the solution of the above embodiment. It is different from the above embodiment in that, the driving method for the touch panel of the present embodiment further comprises a processing of detecting the operation state in the touch period. FIG. 5 is a flowchart of driving method for a touch panel according to some embodiments of the present disclosure. As shown in FIG. 5, the driving method for the touch panel according to this embodiment comprises:

S21: raising the potential of the touch electrode from the voltage value $V_{COM}$ of the common voltage signal to a voltage value $V_{1L}$ of a first low level during a first touch period;

S22: applying a first pulse signal to the touch electrode with the first low level as a reference;

S23: detecting whether there is a touch operation, if there is a touch operation, proceeding to step S24; if there is no touch operation, proceeding to step S25;

S24: continuously applying the first pulse signal to the touch electrode after the end of applying the first pulse signal to the touch electrode; at the end of the first touch period, lowering the potential of the touch electrode from the voltage value $V_{1L}$ of the first low level back to the voltage value $V_{COM}$ of the common voltage signal, and proceeding to step S26;

S25: stopping outputting the first pulse signal after the end of applying the first pulse signal to the touch electrode; at the end of the first touch period, lowering the potential of the touch electrode from the voltage value $V_{1L}$ of the first low level to the voltage value $V_{COM}$ of the common voltage signal, and proceeding to step S26;

S26: inputting a common voltage signal having a voltage value of $V_{COM}$ to the touch electrode during a display period;

S27: lowering the potential of the touch electrode from the voltage value $V_{COM}$ of the common voltage signal to a voltage value $V_{2H}$ of a second high level during a second touch period;

S28: applying a second pulse signal to the touch electrode with the second high level as a reference;

S29: detecting whether there is a touch operation, if there is a touch operation, proceeding to step S30; if there is no touch operation, proceeding to step S31;

S30: continuously applying the second pulse signal to the touch electrode after the end of applying the second pulse signal to the touch electrode; at the end of the second touch period, raising the potential of the touch electrode from the voltage value $V_{2H}$ of the second high level to the voltage value $V_{COM}$ of the common voltage signal, and proceeding to step S32;

S31: stopping outputting the second pulse signal after the end of applying the second pulse signal to the touch electrode; at the end of the second touch period, raising the potential of the touch electrode from the voltage value $V_{2H}$ of the second high level to the voltage value $V_{COM}$ of the common voltage signal, and proceeding to step S32;

S32: entering a next display period.

In this embodiment, detecting whether there is a touch operation in steps S23 and S29 is actually to judge the operation state during the touch period when the first and the second pulse signals are input to the touch electrode. If there is a touch operation, it is judged that the current operation state is an active state; if there is no touch operation, it is judged that the operation state is an idle state. When it is judged that the current operation state is the idle state, only a first pulse signal comprising a set of A pulses is output, and it is in a waiting state for the remaining time of the touch period until the end of the touch period to save power consumption. When it is judged that the current operation state is the active state, after outputting the first pulse signal comprising the set of A pulses, the first pulse signal is continuously output until the touch period is completed, so as to improve the accuracy of determination of a touch position. In an actual implementation, it may be also specified that B pulses are output in the active state. When it is judged that the current operation state is the active state, after outputting the first pulse signal comprising the set of A pulses, the first pulse signal is continuously output until the Bth pulse is output, then it is in a waiting state until the end of the touch period. The number A of pulses in the idle state and the number B of pulses in the active state can be set according to actual needs, for example, B=(3~10)*A.

Figure 6A:
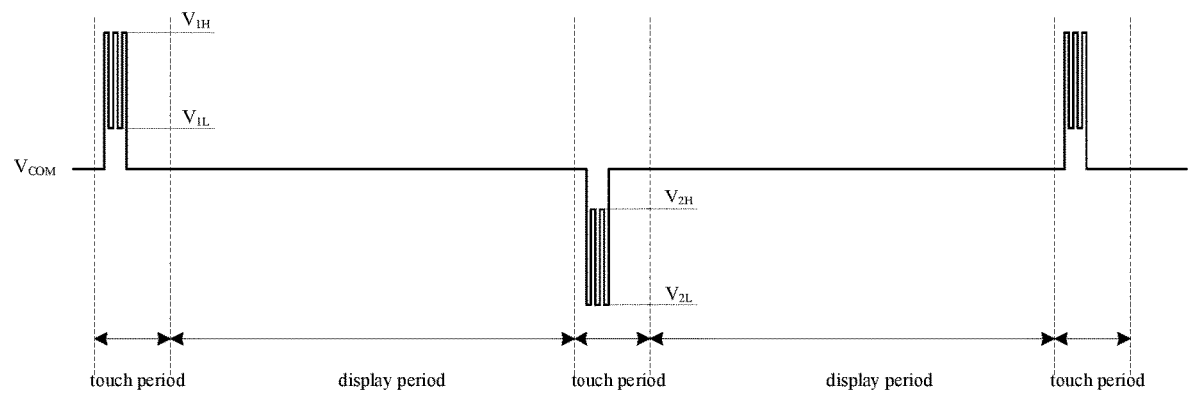
FIG. 6a is a schematic timing diagram of the touch panel in an idle state according to some embodiments of the present disclosure.
Figure 6B:
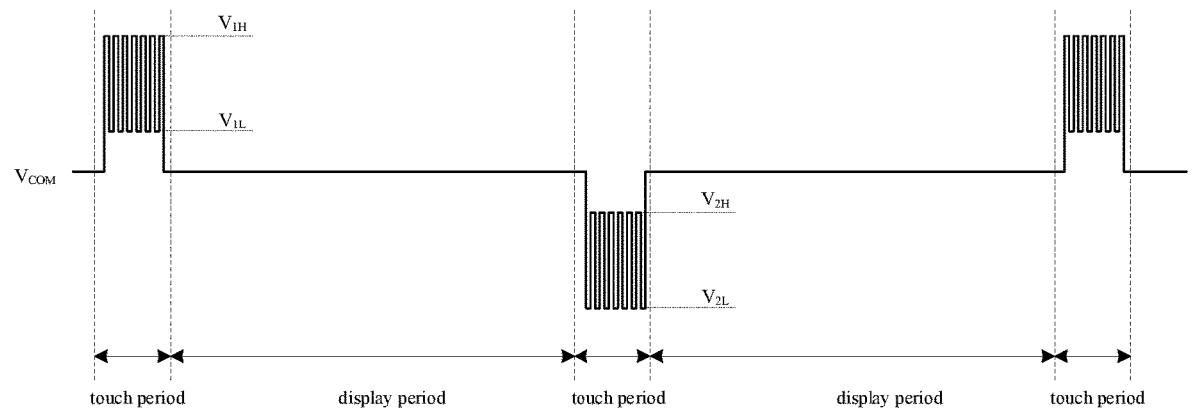
FIG. 6b is a schematic timing diagram of the touch panel in an active state according to some embodiments of the present disclosure.

FIG. 6a is a schematic timing diagram of the touch panel in an idle state according to some embodiments of the present disclosure, and FIG. 6b is a schematic timing diagram of the touch panel in an active state according to some embodiments of the present disclosure. The processing of the driving method for the touch panel according to the embodiment of the present disclosure is as follows. Firstly, the effective time of one display frame is divided into a display period and a touch period. For example, the time of one frame of the touch panel is 16.7 ms, wherein touch period is 1 to 2 ms, and the other time (14.7 to 15.7 ms) is used as the display period. Of course, the lengths of these two periods can be appropriately adjusted according to the processing capability of the touch driving circuit, which will not be limited herein. During the display period, a common voltage signal is applied to all touch signal lines in the touch screen, a high-level display scan signal is sequentially applied to each of gate lines in the touch screen, a thin film transistor on a corresponding gate line is turned on, a gray scale signal applied through a data signal line is transmitted to a pixel electrode, and the liquid crystal is deflected by the pixel electrode and the common electrode to realize the display function. During the touch period, a touch scan signal is applied to all the touch signal lines in the touch screen, and the touch scan signal is loaded onto touch electrodes connected to the touch signal lines. When a human body touches the touch screen, the touch causes the self-capacitance of a corresponding touch electrode to change, so that the voltage signal on the touch electrode changes. The voltage signal can be read through a touch signal line to obtain a touch position and realize the touch function.

In the embodiment of the present disclosure, touch scan signals being opposite in polarity are input to a touch electrode during two touch periods before and after a display period. For example, during a first touch period before the display period, a first pulse signal having a voltage value higher than a common voltage signal voltage value is input to the touch electrode, and it is detected whether there is a touch operation at the same time. If there is no touch operation, only one set of first pulse signal is output, as shown in FIG. 6a. When there is a touch operation, a plurality of sets of first pulse signal are output, as shown in FIG. 6b. During a second touch period after the display period, a second pulse signal having a voltage value lower than the voltage value of the common voltage signal is input to the touch electrode. That is, the first pulse signal and the second pulse signal are opposite in polarity with respect to the common voltage signal, as shown in FIGS. 6a and 6b.

The embodiment of the present disclosure provides a driving method for a touch panel, through inputting touch scan signals being opposite in polarity to the touch electrode during two touch periods before and after the display period, that is, inputting a positive touch scan signal in one touch period and switching to a negative touch scan signal in the next touch period, the single positive touch scan signal in the related art is changed to positive and negative touch scan signals, so that the touch scan signals in the two touch periods are symmetrical with respect to the common voltage signal. The positive and negative touch scan signals compensate and cancel the influence of the touch scan signal on the common voltage signal, which not only cancels the influence of the touch scan signal on the common voltage signal, but also cancels the influence of the touch scan signal on an electric field in the touch panel, thereby extra liquid crystal deflection can be eliminated, visual jitters and afterimages before and after the touch can be avoided, and the display quality can be improved.

Based on the inventive concept of the foregoing embodiments, an embodiment of the present disclosure further provides a driving device for a touch panel. The driving device for the touch panel according to this embodiment comprises:

a first signal circuit for inputting a first touch scan signal to a touch electrode during a first touch period before a display period;

a second signal circuit for inputting a second touch scan signal to the touch electrode during a second touch period after the display period.

The first touch scan signal and the second touch scan signal are opposite in polarity, wherein "the first touch scan signal and the second touch scan signal are opposite in polarity" means that, with respect to the common voltage signal, the polarities of the two touch scan signals are opposite to each other. For example, the voltage value of the first touch scan signal is greater than the voltage value of the common voltage signal, the voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal; or, the voltage value of the first touch scan signal is less than the voltage value of the common voltage signal, the voltage value of the second touch scan signal is greater than the voltage value of the common voltage signal, and a difference value of the voltage value of the common voltage signal minus the voltage value of the first touch scan signal equals a difference value of the voltage value of the second touch scan signal minus the voltage value of the common voltage signal. That is to say, the two touch scan signals are symmetrically arranged with respect to the common voltage signal.

For example, the first signal circuit is used for inputting a first pulse signal having a high-level voltage value of $V_{1H}$ and a low-level voltage value of $V_{1L}$ to a touch electrode during a first touch period before a display period; the second signal circuit is used for inputting a second pulse signal having a high-level voltage value of $V_{2H}$ and a low-level voltage value of $V_{2L}$ to the touch electrode in a second touch period after the display period, wherein $V_{1H} > V_{COM}$, $V_{1L} > V_{COM}$, $V_{2H} < V_{COM}$, $V_{2L} < V_{COM}$, and $V_{1H} - V_{COM} = V_{COM} - V_{2L}$, $V_{1L} - V_{COM} = V_{COM} - V_{2H}$.

In this embodiment, the first signal circuit comprises a first step-up sub-circuit, a first pulse sub-circuit and a first step-down sub-circuit, wherein:

the first step-up sub-circuit is used for raising the potential of the touch electrode from the voltage value $V_{COM}$ of the common voltage signal to a voltage value $V_{1L}$ of a first low level;

the first pulse sub-circuit is used for applying a first pulse signal to the touch electrode with the first low level as a reference;

the first step-down sub-circuit is used for lowering the potential of the touch electrode from the voltage value $V_{1L}$ of the first low level back to the voltage value $V_{COM}$ of the common voltage signal after the end of applying the first pulse signal to the touch electrode.

Applying the first pulse signal by the first pulse sub-circuit may comprise: a first processing of raising the potential of the touch electrode from the voltage value $V_{1L}$ of the first low level to a voltage value $V_{1H}$ of a first high level; lowering the potential of the touch electrode from the voltage value $V_{1H}$ of the first high level to the voltage value $V_{1L}$ of the first low level after holding the first high level for pulse periods, and holding the first low level for pulse periods; and repeating the above first and second processing until the number of pulses reaches a preset value.

In this embodiment, the second signal circuit comprises a second step-down sub-circuit, a second pulse sub-circuit and a second step-up sub-circuit, wherein:

the second step-down sub-circuit is used for lowering the potential of the touch electrode from the voltage value $V_{COM}$ of the common voltage signal to a voltage value $V_{2H}$ of a second high level;

the second pulse sub-circuit is used for applying a second pulse signal to the touch electrode with the second high level as a reference;

the second step-up sub-circuit is used for raising the potential of the touch electrode from the voltage value $V_{2H}$ of the second high level to the voltage value $V_{COM}$ of the common voltage signal after the end of applying the second pulse signal to the touch electrode.

Applying the second pulse signal to the touch electrode may comprise: a third processing of lowering the potential of the touch electrode from the voltage value $V_{2H}$ of the second high level to a voltage value $V_{2L}$ of a second low level; a fourth processing of raising the potential of the touch electrode from the voltage value $V_{2L}$ of the second low level to the voltage value $V_{2H}$ of the second high level after holding the second low level for pulse periods, and holding the second high level for pulse periods; and repeating the above third and fourth processing until the number of pulses reaches a preset value.

In this embodiment, the first signal circuit further comprises a first detection sub-circuit used for detecting whether there is a touch operation during a period in which the first pulse signal is applied to the touch electrode, if there is no touch operation, controlling the first pulse sub-circuit to stop outputting the first pulse signal after the end of applying the first pulse signal to the touch electrode; if there is a touch operation, controlling the first pulse sub-circuit to continuously apply the first pulse signal to the touch electrode after the end of applying the first pulse signal to the touch electrode until the end of the first touch period. The second signal circuit further comprises a second detection sub-circuit used for detecting whether there is a touch operation during the period in which the second pulse signal is applied to the touch electrode, if there is no touch operation, controlling the second pulse sub-circuit to stop outputting the second pulse signal after the end of applying the second pulse signal to the touch electrode; if there is a touch operation, controlling the second pulse sub-circuit to continuously apply the second pulse signal to the touch electrode after the end of applying the second pulse signal to the touch electrode, until the end of the second touch period.

The embodiment of the present disclosure provides a driving device for a touch panel, through inputting touch scan signals being opposite in polarity to the touch electrode during two touch periods before and after the display period, that is, inputting a positive touch scan signal in one touch period and switching to a negative touch scan signal in the next touch period, the single positive touch scan signal in the related art is changed to positive and negative touch scan signals, so that the touch scan signals in the two touch periods are symmetrical with respect to the common voltage signal. The positive and negative touch scan signals compensate and cancel the influence of the touch scan signal on the common voltage signal, which not only cancels the influence of the touch scan signal on the common voltage signal, but also cancels the influence of the touch scan signal on an electric field in the touch panel, thereby extra liquid crystal deflection can be eliminated, visual jitters and after-images before and after the touch can be avoided, and the display quality can be improved.

Based on the inventive concept of the foregoing embodiments, an embodiment of the present disclosure further provides a touch panel comprising the driving device for the touch panel according to the foregoing embodiment. The touch panel can be a mobile phone, a tablet computer, a TV, a display, a notebook computer, a digital frame, a navigator or any other product or component having a display function.

In the description of the present disclosure, it is to be understood that the azimuth or positional relationship indicated by the terms "middle", "upper", "lower", "front", "back", "vertical", "horizontal", "top", "bottom", "inside", "outside" and the like is based on the azimuth or positional relationship shown in the drawings and is merely for the purpose of facilitating the description of the disclosure and simplified description, rather than indicating or implying that the device or element referred to must have a specific orientation, constructed and operated in a particular orientation and therefore cannot be construed as limiting the disclosure.

In the description of the present disclosure, it should be noted that the terms "mount", "connect", "connection" should be broadly understood, unless otherwise specified and defined, for example, "connection" may be a fixed connection or a removable connection, or an integral connection, or a mechanical connection or an electrical connection, or a direct connection, or an indirect connection with an intermediate medium, or a connection between two elements. For those of ordinary skill in the art, the specific meanings of the above terms in this disclosure can be interpreted according to particular situations.

One skilled in the art should understand that, the embodiments of this disclosure may be provided as a method, a system, or a computer program product. Therefore, embodiments of this disclosure can take the form of an entirely hardware embodiment, an entirely software embodiment or an embodiment containing both hardware and software elements. Moreover, the present disclosure may take the form of a computer program product embodied on one or more computer-usable storage media (comprising but not limited to disk storage, optical storage, etc.) having computer-usable program code embodied therein.

The present disclosure is described with reference to flowcharts and/or block diagrams of methods, apparatuses and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable information processing device to generate a machine such that the instructions executed by a processor of a computer or other programmable information processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

While the embodiments of the present disclosure have been described above, the described embodiments are merely for the purpose of understanding the disclosure and are not intended to limit the disclosure. Any modification and variation in the form and details of the embodiments may be made by those skilled in the art without departing from the spirit and scope of the disclosure. However, the spirit and scope of the present disclosure is to be determined by the following claims.

What is claimed is:

1. A driving method for a touch panel, comprising:
   inputting a first touch scan signal to a touch electrode during a first touch period before a display period; and
   inputting a second touch scan signal to the touch electrode during a second touch period after the display period, the first touch scan signal and the second touch scan signal being opposite in polarity,
   wherein inputting the first touch scan signal to the touch electrode comprises:
      raising a potential of the touch electrode from a voltage value of a common voltage signal to a voltage value of a first low level; and
      applying a first pulse signal to the touch electrode with the first low level as a reference; and
   wherein applying the first pulse signal to the touch electrode further comprises:
      detecting whether there is a touch operation;
      if there is no touch operation, stopping outputting the first pulse signal after the end of applying the first pulse signal to the touch electrode; and
      if there is a touch operation, continuously applying the first pulse signal to the touch electrode after the end of applying the first pulse signal to the touch electrode.

2. The driving method according to claim 1, wherein the first touch scan signal and the second touch scan signal being opposite in polarity comprises:
   a voltage value of the first touch scan signal is greater than a voltage value of a common voltage signal, a voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal.

3. The driving method according to claim 1, wherein the first touch scan signal and the second touch scan signal being opposite in polarity comprises:
   a voltage value of the first touch scan signal is less than a voltage value of a common voltage signal, a voltage value of the second touch scan signal is greater than the voltage value of the common voltage signal, and a difference value of the voltage value of the common voltage signal minus the voltage value of the first touch scan signal equals a difference value of the voltage value of the second touch scan signal minus the voltage value of the common voltage signal.

4. The driving method according to claim 1, wherein inputting the first touch scan signal to the touch electrode further comprises:
lowering the potential of the touch electrode from the voltage value of the first low level back to the voltage value of the common voltage signal after an end of applying the first pulse signal to the touch electrode.

5. The driving method according to claim 4, wherein applying the first pulse signal to the touch electrode comprises:
a first processing of raising the potential of the touch electrode from the voltage value of the first low level to a voltage value of a first high level;
a second processing of lowering the potential of the touch electrode from the voltage value of the first high level back to the voltage value of the first low level after holding the first high level for pulse periods, and holding the first low level for pulse periods; and
repeating the above first and second processing.

6. The driving method according to claim 1, wherein inputting the second touch scan signal to the touch electrode comprises:
lowering a potential of the touch electrode from a voltage value of a common voltage signal to a voltage value of a second high level;
applying a second pulse signal to the touch electrode with the second high level as a reference; and
raising the potential of the touch electrode from the voltage value of the second high level to the voltage value of the common voltage signal after an end of applying the second pulse signal to the touch electrode.

7. The driving method according to claim 6, wherein applying the second pulse signal to the touch electrode comprises:
a third processing of lowering the potential of the touch electrode from the voltage value of the second high level to a voltage value of a second low level;
a fourth processing of raising the potential of the touch electrode from the voltage value of the second low level to the voltage value of the second high level after holding the second low level for pulse periods, and holding the second high level for pulse periods; and
repeating the above third and fourth processing.

8. The driving method according to claim 6, wherein applying the second pulse signal to the touch electrode further comprises:
detecting whether there is a touch operation;
if there is no touch operation, stopping outputting the second pulse signal after the end of applying the second pulse signal to the touch electrode; and
if there is a touch operation, continuously applying the second pulse signal to the touch electrode after the end of applying the second pulse signal to the touch electrode.

9. A driving device for a touch panel, comprising:
a first signal circuit for inputting a first touch scan signal to a touch electrode during a first touch period before a display period; and
a second signal circuit for inputting a second touch scan signal to the touch electrode during a second touch period after the display period, the first touch scan signal and the second touch scan signal being opposite in polarity,
wherein the first signal circuit comprises a first step-up sub-circuit and a first pulse sub-circuit, wherein:
the first step-up sub-circuit is used for raising a potential of the touch electrode from a voltage value of a common voltage signal to a voltage value of a first low level; and
the first pulse sub-circuit is used for applying a first pulse signal to the touch electrode with the first low level as a reference; and
wherein the first signal circuit further comprises a first detection sub-circuit, wherein
the first detection sub-circuit is used for detecting whether there is a touch operation during a period in which the first pulse signal is applied to the touch electrode, if there is no touch operation, controlling the first pulse sub-circuit to stop outputting the first pulse signal after the end of applying the first pulse signal to the touch electrode; if there is a touch operation, controlling the first pulse sub-circuit to continuously apply the first pulse signal to the touch electrode after the end of applying the first pulse signal to the touch electrode.

10. The driving device according to claim 9, wherein the first touch scan signal and the second touch scan signal being opposite in polarity comprises:
a voltage value of the first touch scan signal is greater than a voltage value of a common voltage signal, a voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal.

11. The driving device according to claim 9, wherein the first touch scan signal and the second touch scan signal being opposite in polarity comprises:
a voltage value of the first touch scan signal is less than a voltage value of a common voltage signal, a voltage value of the second touch scan signal is greater than the voltage value of the common voltage signal, and a difference value of the voltage value of the common voltage signal minus the voltage value of the first touch scan signal equals a difference value of the voltage value of the second touch scan signal minus the voltage value of the common voltage signal.

12. The driving device according to claim 9, wherein the first signal circuit further comprises a first step-down sub-circuit, wherein:
the first step-down sub-circuit is used for lowering the potential of the touch electrode from the voltage value of the first low level back to the voltage value of the common voltage signal after the end of applying the first pulse signal to the touch electrode.

13. The driving device according to claim 9, wherein the second signal circuit comprises a second step-down sub-circuit, a second pulse sub-circuit and a second step-up sub-circuit, wherein:
the second step-down sub-circuit is used for lowering a potential of the touch electrode from a voltage value of a common voltage signal to a voltage value of a second high level;
the second pulse sub-circuit is used for applying a second pulse signal to the touch electrode with the second high level as a reference; and
the second step-up sub-circuit is used for raising the potential of the touch electrode from the voltage value of the second high level to the voltage value of the common voltage signal after an end of applying the second pulse signal to the touch electrode.

14. The driving device according to claim 13, wherein the second signal circuit further comprises a second detection sub-circuit, wherein the second detection sub-circuit is used for detecting whether there is a touch operation during a period in which the second pulse signal is applied to the touch electrode, if there is no touch operation, controlling the second pulse sub-circuit to stop outputting the second pulse signal after the end of applying the second pulse signal to the touch electrode; if there is a touch operation, controlling the second pulse sub-circuit to continuously apply the second pulse signal to the touch electrode after the end of applying the second pulse signal to the touch electrode.

15. A display panel, comprising the driving device for a touch panel according to claim 9.

16. The driving panel according to claim 15, wherein the first touch scan signal and the second touch scan signal being opposite in polarity comprises:

a voltage value of the first touch scan signal is greater than a voltage value of a common voltage signal, a voltage value of the second touch scan signal is less than the voltage value of the common voltage signal, and a difference value of the voltage value of the first touch scan signal minus the voltage value of the common voltage signal equals a difference value of the voltage value of the common voltage signal minus the voltage value of the second touch scan signal.

17. The driving panel according to claim 15, wherein the first signal circuit further comprises a first step-down sub-circuit, wherein:

the first step-down sub-circuit is used for lowering the potential of the touch electrode from the voltage value of the first low level back to the voltage value of the common voltage signal after the end of applying the first pulse signal to the touch electrode.

18. The driving panel according to claim 9, wherein the second signal circuit comprises a second step-down sub-circuit, a second pulse sub-circuit and a second step-up sub-circuit, wherein:

the second step-down sub-circuit is used for lowering a potential of the touch electrode from a voltage value of a common voltage signal to a voltage value of a second high level;

the second pulse sub-circuit is used for applying a second pulse signal to the touch electrode with the second high level as a reference; and the second step-up sub-circuit is used for raising the potential of the touch electrode from the voltage value of the second high level to the voltage value of the common voltage signal after an end of applying the second pulse signal to the touch electrode.

* * * * *